United States Patent [19]
Saunders

[11] 3,867,721
[45] Feb. 18, 1975

[54] CARTRIDGE EJECT MECHANISM FOR TAPE PLAYERS AND THE LIKE

[75] Inventor: Allan L. Saunders, Melrose, Mass.

[73] Assignee: Automatic Radio Mfg. Co., Inc., Melrose, Mass.

[22] Filed: Jan. 30, 1973

[21] Appl. No.: 327,947

[52] U.S. Cl. .................... 360/93
[51] Int. Cl. .................... G11b 25/06
[58] Field of Search .................... 360/93–96, 360/137, 69

[56] References Cited

UNITED STATES PATENTS

| | | | |
|---|---|---|---|
| 3,485,500 | 12/1969 | Loeschner et al. | 360/93 |
| 3,684,300 | 8/1972 | Clark | 360/93 |
| 3,726,456 | 4/1973 | Church et al. | 360/93 |
| 3,759,530 | 9/1973 | Sampei | 360/93 |

*Primary Examiner*—Stanley M. Urynowicz, Jr.
*Attorney, Agent, or Firm*—Thompson, Birch, Gauthier & Samuels

[57] ABSTRACT

For use with a tape player or other like device of the type having a receiving channel or tunnel into which a tape cartridge is inserted, an eject mechanism actuated in response to lateral movement of the cartridge in the tunnel for exerting an ejecting force on the cartridge.

10 Claims, 6 Drawing Figures

CARTRIDGE EJECT MECHANISM FOR TAPE PLAYERS AND THE LIKE

DESCRIPTION OF THE INVENTION

This invention relates generally to magnetic tape players of the type having a tunnel or receiving channel into which a cartridge containing an endless magnetic tape is inserted into a "play" position, with the tape in contact with a transducer head and a rotating drive wheel at the inner end of the tunnel, and is particularly concerned with a novel and improved mechanism for ejecting the cartridge from the play position.

Certain of the tape player models which have heretofore been developed have lacked eject mechanisms for pushing the cartridge out of its fully seated play position in the cartridge tunnel. Without an eject mechanism, the front or face plate of the tape player must be designed to permit the rear end of the cartridge to protrude sufficiently so that the cartridge can be manually grasped and pulled out. This excessive protrusion is unsightly and where the player is mounted in the passenger compartment of an automobile, as is frequently the case, the protruding cartridge can also comprise a safety hazard.

In an attempt at avoiding these problems, other known tape players have included eject mechanisms which are either mechanically or electrically actuated by means of an operating button exteriorly located on the front of the tape player. With mechanically actuated mechanisms, the operating buttons must be connected to the interior components of the eject mechanism by means of linkage arrangements. This in turn limits the available locations for the operating buttons on the face plates of the players, and thus complicates the task of designing attractive units. The electrically actuated eject mechanisms usually employ solenoids to exert the ejecting force on the cartridge. These arrangements are more adaptable from a design standpoint because the operating buttons are electrically connected to the solenoids by flexible wire leads, which in turn allow more latitude in selecting the locations of the buttons on the face plates of the player. However, the solenoids have been found to be bulky, thus increasing the overall size and weight of the players into which they are incorporated. The solenoid actuated mechanisms are also relatively expensive as compared to those that are mechanically actuated. Finally, the need for an exteriorly positioned operating button, whether used in connection with an electrically or mechanically actuated mechanism, is of itself a detracting feature from the aesthetic standpoint.

It is, accordingly, a general object of the present invention to provide an improved eject mechanism for a tape player or other like device which obviates the problems outlined above. A more specific object of the present invention is the provision of an eject mechanism which is mechanically actuated by lateral movement of the cartridge, thereby avoiding the need for an exteriorly positioned operating button. Other objects of the present invention include the provision of an eject mechanism which is lighter in weight, more compact, cheaper and more reliable than those heretofore available.

These and other objects and advantages of the present invention will become more apparent as the description proceeds with the aid of the accompanying drawings wherein.

Figure 1:
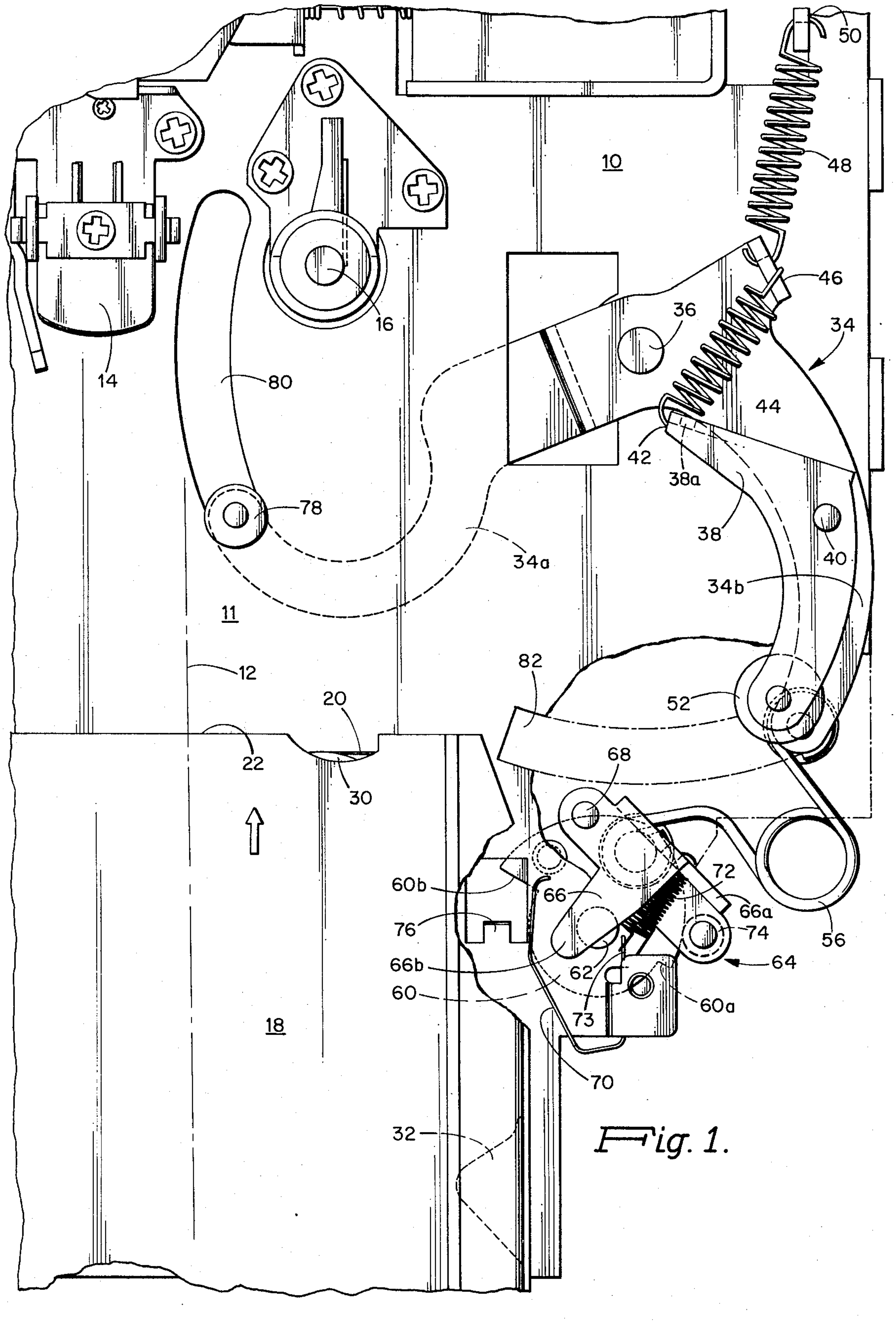
FIG. 1 is a plan view with portions broken away showing an eject mechanism in accordance with the present invention, with the tape cartridge partially inserted at the entrance end of the cartridge receiving channel or tunnel.
Figure 2:
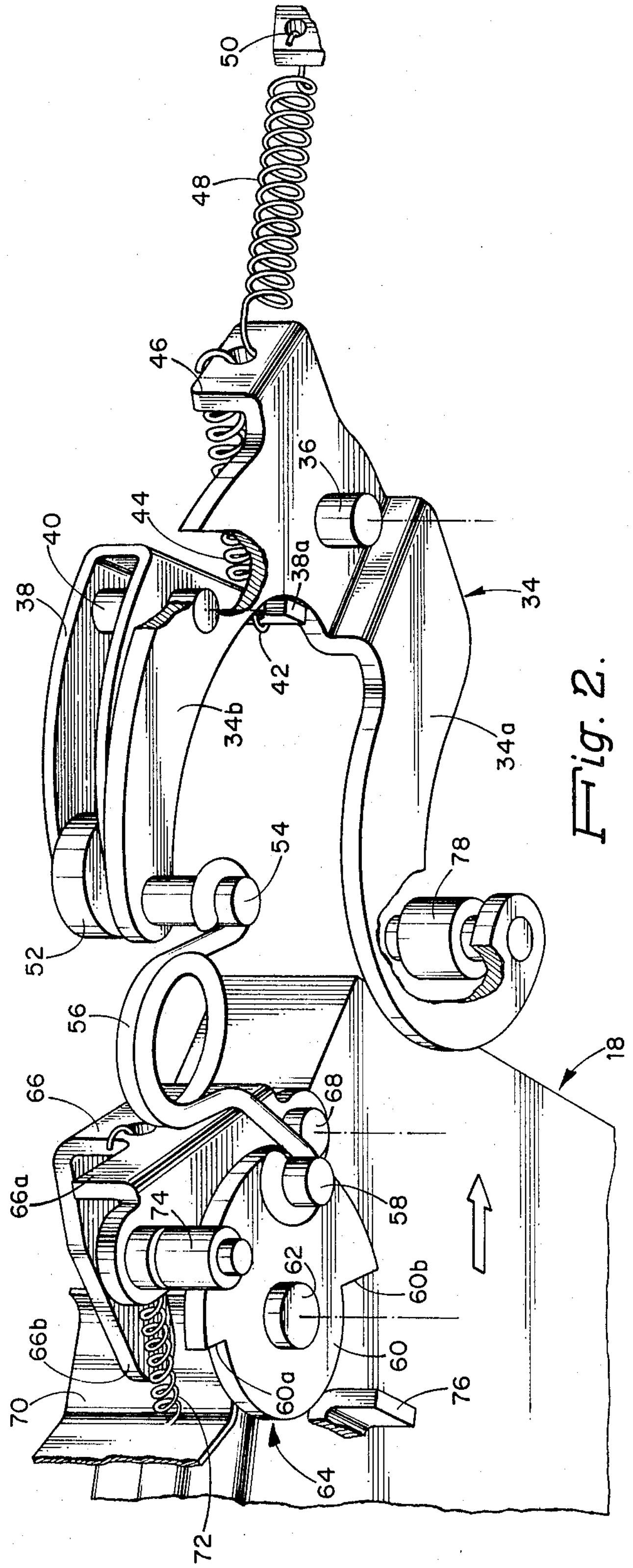
FIG. 2 is a partial bottom perspective view of the eject mechanism as shown in FIG. 1; and, FIGS. 3 to 6 are views on a reduced scale showing the eject mechanism at various stages during its operation.

Referring initially to FIGS. 1 and 2, there is shown at 10 the chassis or base plate of a tape player. The player is further provided with side and top walls (not shown) which cooperate with the base plate 10 to define a cartridge receiving channel or tunnel 11, the longitudinal axis of which is schematically depicted in FIG. 1 by the dot-dash line 12.

Figure 5:
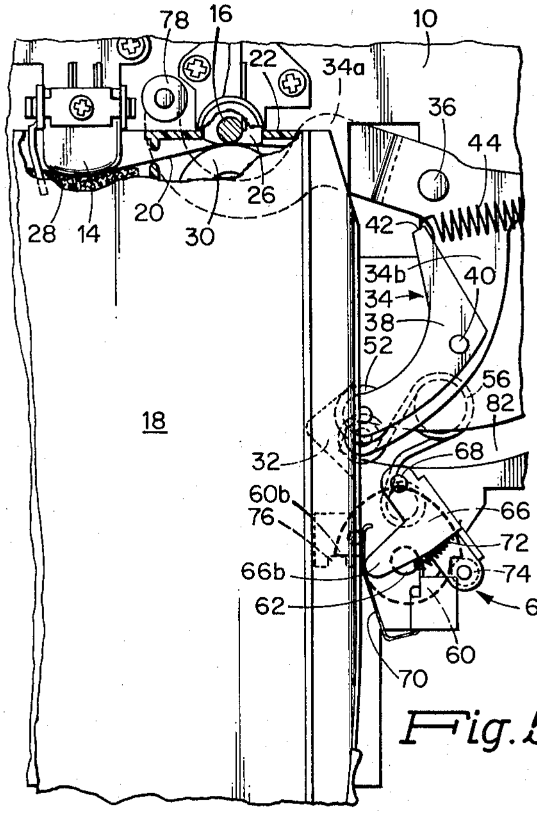

A transducer head 14 and a rotatable drive wheel 16 are located at the inner end of the cartridge tunnel 11. A tape cartridge 18 is shown at different locations in the tunnel 11 throughout the several views. The cartridge 18 contains an endless magnetic tape 20, and as is best shown in FIG. 5, the front wall 22 of the cartridge is provided with openings 24 and 26, the former exposing the tape 20 where it is backed by a resilient pad 28, and the latter exposing the tape where it runs over an idler wheel 30 rotatably supported by the cartridge 18. The cartridge is further provided with a V-shaped side notch 32, the purpose of which will hereinafter be described. To the extent thus described, the tape player components and cartridge are conventional and known to those skilled in the art.

The novel and improved eject mechanism of the present invention will now be further described as including a link member generally indicated at 34 which is mounted by means of a pin 36 for pivotal movement relative to the base plate 10. The link member 34 has two arms 34*a* and 34*b*. The arm 34*b* has a finger 38 pivotally mounted thereon by means of a pin 40. One end of the finger 38 is connected as at 42 to a spring 44 which is in turn connected at its opposite end to an upstanding ear 46 on the link member 34. The spring 44 is in tension and thus exerts a clockwise torque on finger 38, which in the condition shown in FIGS. 1 and 2, holds a depending flange 38*a* on the finger 38 against the inside edge of arm 34*b*. Another spring 48 extends from the ear 46 to a fixed point as at 50 on the base plate or chassis 10. The spring 48 is also in tension, thus exerting a counterclockwise torque on link 34. A retaining wheel 52 is rotatably mounted on the opposite end of the finger 38.

A pin 54 (see FIG. 2) extends downwardly from the distal end of arm 34*b*. A spring 56 is connected at one end to the pin 54 and at its opposite end to another pin 58 which extends downwardly from the lower face of a cam 60, the latter being rotatable about a pin 62 which is laterally spaced from and parallel to the pin 36 pivotally supporting the link member 34. The pin 62 is fixed relative to base plate 10.

The cam 60 forms part of a "cocking mechanism" which is generally indicated by the reference numeral 64. A trigger member 66 overlies the cam 60 and is mounted for pivotal movement relative to the base plate 10 by means of another pin 68. A resilient guard 70 protrudes angularly into one side of the cartridge receiving channel or tunnel 11. A spring 72 extends between a fixed ear 73 and an ear 66*a* on the trigger 66 to exert a clockwise torque on the trigger. The trigger 66 is further provided with a finger 66b and a depending roller-stop 74 which as will hereinafter be described, is arranged to coact with a shoulder 60a on the cam 60. Another fixed stop 76 is arranged to coact with another shoulder 60b on the cam 60.

The arm 34a of link member 34 is provided at its distal end with an upstanding contact roller 78 which is adapted to move along an arcuate slot 80 in the base plate 10. Another arcuate slot 82 accommodates pivotal movement of the depending pin 54 on the arm 34b of link member 34.

The eject mechanism of the present invention operates in the following manner; as viewed in FIGS. 1 and 2, the mechanism is in a completely inoperative condition with the spring 48 exerting a counterclockwise torque on the link member 34, thereby holding the contact roller 78 at the base of slot 80 and the pin 54 at the right-hand end of slot 82. The spring 56 is completely unloaded; the cocking mechanism 64 is inoperative, and the finger 66b on trigger 66 is spaced from the resilient guard 70. The cartridge 80 is shown being pushed into the tunnel 11 with its front wall 22 spaced from and moving towards the contact roller 78.

Figure 3:
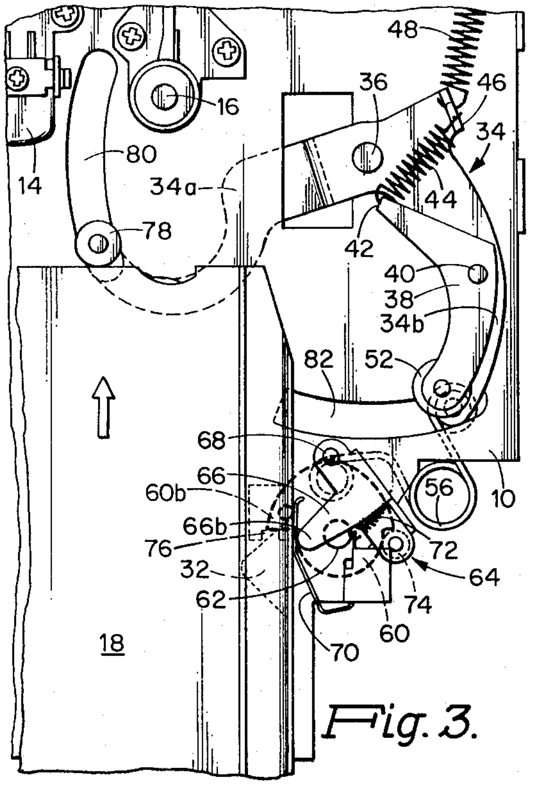

With further reference to FIG. 3, it will be seen that as the front wall 22 of the cartridge 18 initially engages the contact roller 78, the link member 34 begins to pivot in a clockwise direction about pin 36. This intitial motion is transmitted through spring 56 to the rotatable cam 60 and the latter is caused to rotate in the counterclockwise direction until its shoulder 60b contacts fixed stop 76. At the same time, the shoulder 60a on cam 60 is rotated in relation to the roller-stop 74 on trigger member 66 and the roller stop snaps (under the influence of spring 72) behind the shoulder 60a. As this occurs, the finger 66b on trigger 66 snaps into engagement with the resilient guard 70. Thus, it will be seen that after the shoulder 60b has engaged fixed stop 76, and the shoulder 60a has been engaged by the roller stop 74, the cam 60 is thereafter prevented from rotating in either the clockwise or counterclockwise direction about pin 62. This in effect engages the cocking mechanism 64.

Figure 4:
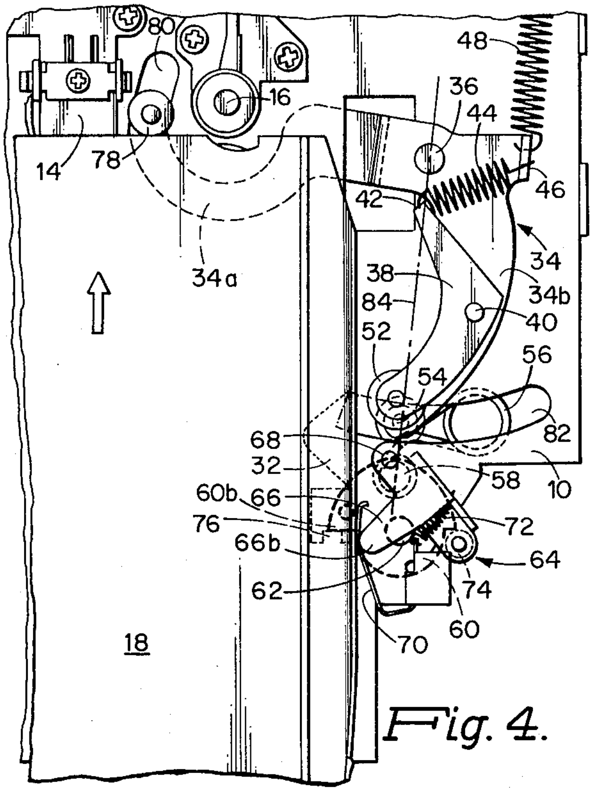

As shown in FIG. 4, continued movement of the cartridge 18 into the tunnel 11 is accompanied by continued clockwise rotation of the link member 34 about the axis of pin 36. This in turn causes the pin 54 to move towards the pin 58, the latter now being fixed due to the non-rotative condition of cam 60. As pin 54 moves towards pin 58, the spring 56 is loaded. The loading of spring 56 will continue until as shown in FIG. 4, the pins 36, 54 and 58 are aligned along a common axis depicted schematically at 84.

As shown in FIG. 5, continued movement of the cartridge 18 into the "play" position with the magnetic tape 20 in contact with both the transducer head 14 and the rotatable drive wheel 16 will produce the following results: the pin 54 will be moved laterally "over center" to the left of the schematic axis 84, thereby causing the pin 54 to move away from pin 58 with a corresponding partiala unloading of the spring 56 which in turn will exert a force on the arm 34b of link member 34, causing the link member to be rotated to its extreme counterclockwise position with the contact roller 78 pushed to the top of slot 80. At this point, the contact roller will be spaced from the front wall 22 of the cartridge 18 and will thus not interfere with the operation of the rotating drive wheel 16 and transducer head 14. At the same time, the retaining wheel 52 will be firmly seated in the side notch 32 of the cartridge, thus exerting a seating force on the cartridge which will hold the cartridge in place during operation of the tape player. The components of the eject mechanism will continue to remain in the condition shown in FIG. 5 while the tape 20 is being played.

Figure 6:
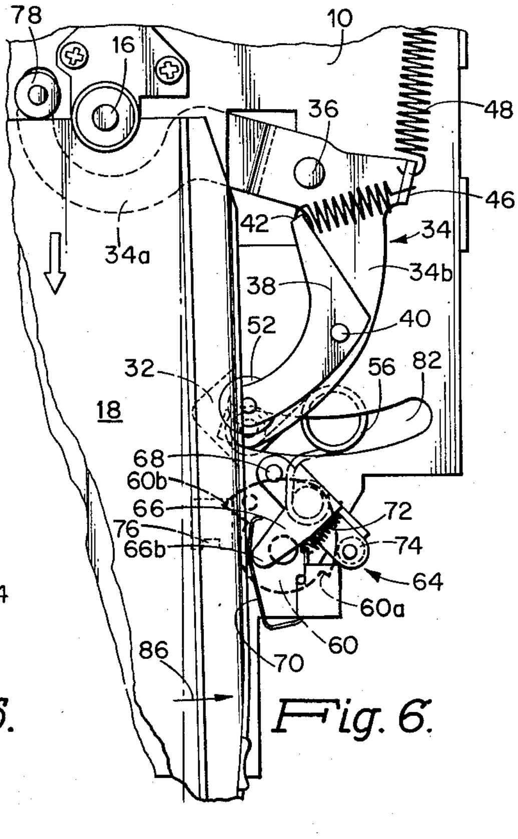

As shown in FIG. 6, when it is desired to eject the cartridge 18 from its play position, the cartridge is manually pushed to the right as indicated schematically by the arrow 86. This lateral movement is transferred through the resilient guard 70 to the finger 66b on the trigger 66, thereby causing a slight counterclockwise shifting of the trigger about pin 68. When this occurs, the roller stop 74 is disengaged from the shoulder 60a on the cam 60, thereby freeing the cam and its depending pin 58 for rotation in a clockwise direction. This in turn permits the spring 56 to unload. As the spring 56 unloads, the link member 34 is snapped in a counterclockwise direction back to its original position as shown in FIG. 1, and as this occurs, the contact roller 78 engages the front wall 22 of the cartridge and exerts an ejecting force thereagainst which axially pushed the cartridge 18 out of its play position. Once this has occurred, the rear end of the cartridge protrudes exteriorly from the tunnel 11 and can thus be easily grasped and removed.

In light of the foregoing, it will now be more evident to those skilled in the art that the eject mechanism of the present invention provides significant advantages over those which have heretofore been developed. Of prime importance is the ability to trigger the eject mechanism by simply laterally shifting the cartridge 18, thereby completely obviating the need for any exteriorly positioned operating button. This advantage is achieved by means of a linkage arrangement which is reliable in operation and relatively inexpensive in construction as compared with other known arrangements. Of further importance is the feature of the contact roller 78 being spaced forwardly of the front cartridge wall when the cartridge is in the play position, thus avoiding any interference with the proper seating of the cartridge in the play position.

It is my intention to cover all changes and modifications of the embodiment herein chosen for purposes of disclosure which do not depart from the spirit and scope of the invention.

I claim:

1. For use with tape players and the like having a tunnel into which a tape cartridge is inserted, apparatus for exerting an ejecting force on the cartridge comprising: a link means connected to a cocking mechanism by a spring means, said link means being pivotally movable in one direction in response to insertion of a tape cartridge into the tunnel, the said pivotal movement in one direction being accompanied by an actuation of said cocking mechanism and a loading of said spring means, and trigger means for releasing said cocking mechanism in response to lateral movement of a tape cartridge in the tunnel, thereby allowing said spring means to unload with an accompanying pivotal movement of said link means in the opposite direction, which movement in the opposite direction causes said link means to exert an ejecting force on the tape cartridge.

2. The apparatus as claimed in claim 1 wherein said link means is mounted at a location intermediate the ends thereof for pivotal movement about an axis which is positioned laterally of the cartridge receiving tunnel.

3. The apparatus as claimed in claim 2 wherein said cocking mechanism includes a cam member rotatable about a second axis which is laterally spaced from and parallel to said first-mentioned axis, and wherein said spring means is connected at one end to said cam member and at the other end to one end of said link means.

4. The apparatus as claimed in claim 3 wherein the other end of said link means is provided with contact means protruding into the path of a tape cartridge being inserted into said tunnel.

5. The apparatus as claimed in claim 4 wherein said contact means comprises a roller.

6. The apparatus as claimed in claim 4 further characterized by retaining means at the said one end of said link means, said retaining means being adapted to cooperate with a notch in the side of a tape cartridge to exert a force on the cartridge which urges the cartridge into the play position in the tunnel.

7. The apparatus as claimed in claim 6 wherein said cam member is further characterized by first and second shoulders, said first shoulder being adapted to engage a fixed stop to prevent rotation of said cam member in one direction, and said second shoulder being adapted to engage another stop on said trigger means to prevent rotation of said cam member in the opposite direction.

8. The apparatus as claimed in claim 7 wherein the pivotal motion of said link means in said one direction about said first-mentioned axis is accompanied by movement of the said one end of said link means along an arcuate path from a first position through a second intermediate position to a third position, the said movement between said first and second positions being in response to engagement of a cartridge with said contact means as the cartridge is pushed into the tunnel, the said movement between said first and second positions being accompanied by a loading of said spring means, which in turn has the effect of urging said cam means to rotate in said one direction until said first and second shoulders engage said stops, the said movement between said second and third positions being accompanied by a partial unloading of said spring means as said retaining means is brought into cooperative engagement with the notch in the cartridge, by said cam means being urged to rotate in the opposite direction, and by said contact means being pivoted to a location out of engagement with the tape cartridge.

9. The apparatus as claimed in claim 8 wherein operation of said trigger means in response to lateral movement of the cartridge will cause movement of the said other stop away from said second shoulder, thereby permitting said cam means to rotate in said opposite direction, which rotation is accompanied by a complete unloading of said spring means as the said one end of said link means returns along said arcuate path from said third position through said second position to said first position, thereby moving said retaining means out of engagement with the notch in the cartridge and allowing the contact means to engage the cartridge and exert an ejecting force thereon.

10. In a tape player of the type having a tunnel with a transducer head and rotating capstain at the inner end thereof, the said tunnel being adapted to receive a tape cartridge containing an endless magnetic tape in axial insertion therein with the tape in contact with both the transducer head and capstain when the cartridge is in the "play position," the improvement comprising: link means mounted for pivotal movement about an axis which is located laterally of the tunnel, spring means connecting one end of said line means to a cocking mechanism, the said one end of said link means being further provided with a retaining means adapted to cooperate with a notch in the side of the tape cartridge, contact means at the other end of said link means, said contact means protruding into the tunnel, whereupon when a cartridge is inserted into the tunnel, the contact means will be engaged by the front end of the cartridge, thus causing the link means to pivot in one direction about said axis, the said pivotal motion being accompanied by movement of the said one end of the link means along an arcuate path from a first poisiton through a second position to a third position, the aforesaid movement between said first and second positions being accompanied by an actuation of the cocking mechanism and a loading of the spring means, and the continued movement between said second and third positions being accompanied by a partial unloading of said spring means, which in turn cooperatively engages said retaining means with the notch to push the cartridge into the play position while said contact means moves away from the cartridge, and trigger means for releasing said cocking mechanism in response to lateral movement of a tape cartridge in the tunnel, which release permits the spring means to unload further as the said one end of said link means returns along said arcuate path from said third position through said second position to said first position, thereby disengaging said retaining means from the cartridge notch while bringing the contact means into engagement with the cartridge to exert a force thereon which moves the cartridge out of the play position.

* * * * *